United States Patent
Daft et al.

(10) Patent No.: US 8,277,380 B2
(45) Date of Patent: Oct. 2, 2012

(54) PIEZOELECTRIC AND CMUT LAYERED ULTRASOUND TRANSDUCER ARRAY

(75) Inventors: Christopher M. W. Daft, Pleasanton, CA (US); Paul A. Wagner, San Carlos, CA (US); Xuanming Lu, Issaquah, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 519 days.

(21) Appl. No.: 11/900,561

(22) Filed: Sep. 11, 2007

(65) Prior Publication Data

US 2009/0069686 A1   Mar. 12, 2009

(51) Int. Cl.
*A61B 8/14* (2006.01)
(52) U.S. Cl. .................. 600/459; 600/437; 600/407
(58) Field of Classification Search .............. 600/453, 600/459, 437, 407; 257/414; 310/334
See application file for complete search history.

(56) References Cited

U.S. PATENT DOCUMENTS

| 6,013,032 | A | 1/2000 | Savord | |
| 6,676,602 | B1 * | 1/2004 | Barnes et al. | 600/443 |
| 6,994,674 | B2 | 2/2006 | Sheljaskow et al. | |
| 2004/0085858 | A1 * | 5/2004 | Khuri-Yakub et al. | 367/181 |
| 2004/0189499 | A1 * | 9/2004 | Han et al. | 341/143 |
| 2005/0015009 | A1 * | 1/2005 | Mourad et al. | 600/438 |
| 2005/0094490 | A1 * | 5/2005 | Thomenius et al. | 367/155 |
| 2005/0146247 | A1 * | 7/2005 | Fisher et al. | 310/334 |
| 2005/0203404 | A1 * | 9/2005 | Freiburger | 600/453 |
| 2007/0167752 | A1 | 7/2007 | Proulx et al. | |
| 2009/0048519 | A1 * | 2/2009 | Hossack et al. | 600/459 |
| 2010/0207489 | A1 * | 8/2010 | Huang | 310/336 |

OTHER PUBLICATIONS

U.S. Appl. No. 11/731,567, filed Apr. 4, 2007.
U.S. Appl. No. 11/731,568, filed Apr. 4, 2007.
U.S. Appl. No. 11/788,614, filed Apr. 20, 2007.

* cited by examiner

*Primary Examiner* — Tse Chen
*Assistant Examiner* — Joel F Brutus

(57) ABSTRACT

A CMUT or other semiconductor-based transducer is stacked with a piezoelectric transducer (PZT). The CMUT is sufficiently thin to avoid or limit interference with sound propagation through the CMUT from or to the PZT or crosstalk between transmitter elements. The PZT/CMUT layered structure is used as a matrix array, such as an array with a multi-dimensional arrangement of elements. The CMUT array is formed and thinned using semiconductor processing. The PZT transmits acoustic energy through the thin CMUT. The CMUT receives responsive echoes. Using integrated electronics in the thin wafer of the CMUT limits interconnection problems for the matrix receive array.

13 Claims, 5 Drawing Sheets

PIEZOELECTRIC AND CMUT LAYERED ULTRASOUND TRANSDUCER ARRAY

BACKGROUND

The present embodiments relate to transducer arrays. Transducer arrays convert between electrical and acoustic energies.

Different types of transducer arrays have different characteristics. Depending on the desired use, one of the types of arrays is selected for an implementation. The same array is used for both transmit and receive operation.

Piezoelectric transducers rely on expansion and contraction of material in response to changes in acoustic energy and/or changes in electrical potential. Electrodes are positioned on opposite sides of piezoelectric material for transduction.

Capacitive membrane ultrasound transducers (CMUT) rely on flexing of a membrane for transduction. Electrodes are on opposite sides of a gap. The membrane is positioned over the gap, allowing flexing in response to changes in acoustic energy or electrical potential.

However, the selected type of array may not be optimal for the different uses of the array. For example, CMUTs that produce enough power in transmit at low frequencies appropriate for trans-thoracic cardiac or deep abdominal imaging are difficult to design. As another example, piezoelectric transducers have more limited interconnection options, so likely have fewer elements.

BRIEF SUMMARY

By way of introduction, the preferred embodiments described below include methods, systems, improvements, and transducer arrays for transducing between electrical and ultrasound energies and/or for medical diagnostic ultrasound imaging. A same transducer includes both piezoelectric and CMUT transducer layers.

In a first aspect, an improvement is provided for an ultrasound transducer array for medical diagnostic ultrasound imaging. An element has a piezoelectric transducer layer and a capacitive membrane ultrasound transducer layer.

In a second aspect, a system is provided for transducing between electrical and ultrasound energies. A first multi-dimensional array of first elements is formed from piezoelectric material. A second multi-dimensional array of second elements is formed from semiconductor material. The second multi-dimensional array at least partially covers a top of the first multi-dimensional array such that acoustic energy generated by the first multi-dimensional array propagates to a patient through the second multi-dimensional array.

In a third aspect, a method is provided for generating ultrasound imaging information with a transducer. Acoustic energy is transmitted through a layer of semiconductor substrate. Acoustic echoes responsive to the transmitting are received at the layer of semiconductor substrate. The acoustic echoes are converted to electrical energy by one or more transducers formed in or on the semiconductor substrate.

The present invention is defined by the following claims, and nothing in this section should be taken as a limitation on those claims. Further aspects and advantages of the invention are discussed below in conjunction with the preferred embodiments and may be later claimed in combinations or independently.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A CMUT or other semiconductor-based transducer is stacked with a piezoelectric transducer (PZT). The CMUT is sufficiently thin to avoid or limit interference with sound propagation through the CMUT from or to the PZT.

In one embodiment, the PZT/CMUT layered structure is used as a matrix array, such as an array with a multi-dimensional arrangement of elements. For example, a transthoracic cardiac probe has a bistatic PZT-silicon design where the receiver CMUT overlays the transmitter PZT. Transthoracic cardiac arrays are constrained in their aperture size. Sharing of aperture area between separate transmit and receive portions may not be feasible for multi-dimensional arrays. As another example, an abdominal probe is provided for sector scanning. The CMUT array is formed and thinned using semiconductor processing. The PZT transmits acoustic energy through the thin CMUT. The CMUT receives responsive echoes. Using integrated electronics in the thin wafer of the CMUT limits interconnection problems for the matrix receive array.

The PZT/CMUT layered structure may be used for a harmonic imaging array. Acoustic energy is transmitted at a fundamental frequency, and echoes are received at a harmonic frequency of the fundamental frequency, such as a second harmonic. This structure produces good harmonic SNR and beam profile since the sound traversing the silicon layer is at the fundamental frequency.

The arrays and/or system connections of the PZT and CMUT layers may be different. For example, a relatively low element count matrix PZT array connects through cables with transmitters in an imaging system. The transmitters may be arbitrary waveform generators rather than simple square wave transmitters suitable for location in a probe housing, saving cost and avoiding power usage limitations. A relatively high element count silicon CMUT array overlays the low element count PZT array. The die for the CMUT array is thinned to allow passing of ultrasound transmissions. Receiver electronics may be implemented in the silicon of the CMUT, such as implementing a sigma-delta receiver (analog-to-digital converter) and full or partial beamformer. The high element count may not create interconnection issues because of the integrated beam formation in the semiconductor also used for the CMUT. A flex circuit may be used to connect to the imaging system. Using harmonic reception may decrease the number of transmit elements needed for a given beam quality. The transmit array creates a strong main lobe for harmonic imaging with less concern about side lobes due to the side lobe reduction by receiving at the harmonic and by using a more finely sampled receiver matrix.

Figure 1:
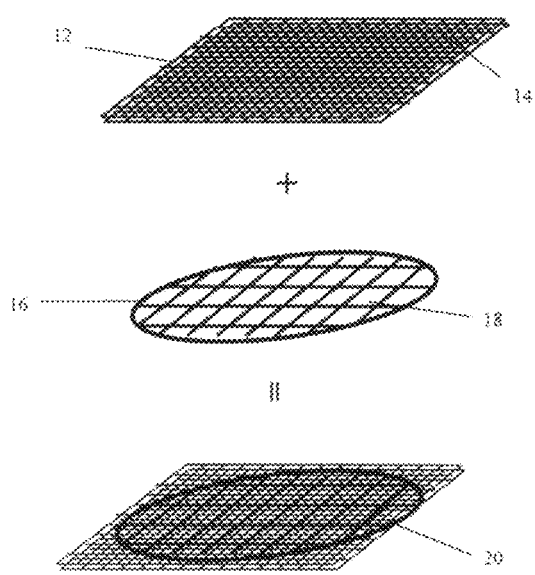
FIG. 1 is a graphical illustration of layering two different types of multi-dimensional arrays of elements.

FIG. 1 shows an ultrasound transducer array for medical diagnostic ultrasound imaging. The transducer array includes two layers of arrays 12, 16. Additional layers of arrays may be provided. One layer and the corresponding elements are a piezoelectric transducer, and the other layer and corresponding elements are a capacitive membrane ultrasound transducer. Both layers may be of the same type of transducer in other embodiments, such as using a PZT film instead of a CMUT.

Both layers 12, 16 of arrays include multi-dimensional arrays of elements 14, 18, but one-dimensional arrays may be used for one or both of the arrays. The elements 14, 18 are arranged in any pattern, such as on a rectangular, hexagonal, triangular, or other grid. For example, the elements 14, 18 are provided in an N×M rectangular grid where both N and M are greater than one. Full or sparse spacing of the elements 14, 18 may be provided.

In one example embodiment, the multi-dimensional array of elements 18 is formed from piezoelectric material. The array is fully sampled, but is coarse as compared to the more finely sampled array of elements 14. For example, 256 elements 18 are positioned in a circular array on the PZT layer 16. The array has a diameter of about 18 elements, and the elements 18 have a $0.6\lambda$ pitch. The elements 18 of the array connect with a same number of linear system transmitters for transmitting at a band of frequencies centered at about 1.5 MHz. Such an array may form a tight main lobe for harmonic generation. Beams transmitted along edge lines of a scan volume may have higher grating lobe energy.

In this example embodiment, the multi-dimensional array of elements 14 is formed from silicon or other semiconductor material. The elements 14 are on silicon or other semiconductor substrate of the layer 12, such as being CMUTs formed in the surface of the substrate. The array is fully sampled, but is fine as compared to the more coarsely sampled array 16. For example, an 80×80 array 12 of elements 14 are provided in a square aperture. The elements 14 have a $0.4\lambda$ pitch for receiving at 3 MHz (harmonic operation) (about ⅔ the pitch of the elements 18). The same or different pitch may be used, such as the two arrays having the same pitch with aligned or misaligned elements 14, 18. Other sizes of elements or the array, numbers of elements 14, pitches, frequencies, or diameters may be used. Other relative pitches or sampling may be used.

The piezoelectric array is positioned below the semiconductor material array. The semiconductor material may be used for a CMUT array, but be thin enough to limit interference with ultrasound energy passing through the semiconductor material. For example, the semiconductor material layer 12 has a thickness of 30 microns or less. Greater thicknesses may be used. A lesser thickness may be provided, such as 20 microns or less. Lesser thickness may cause lesser interference with acoustic energy transmitted from or received by the PZT array below the semiconductor array. The die of semiconductor substrate is thin enough that transmission can occur without significant reverberation or crosstalk generation.

As shown if FIG. 1, the upper CMUT array completely covers a top surface of the lower PZT array. The top surface is the surface closest to the region to be scanned, such as the patient. In other embodiments, only a portion of the lower array is covered by the upper array, such as one or more elements 18 of the lower array 16 being exposed without any acoustic interference from the upper array. Acoustic energy generated by the lower array propagates to a patient through the upper array with no, little, or acceptable interference.

In the example embodiment shown in FIG. 1, the elements 14 have about twice the pitch of the elements 18. The same or other differences in pitch may be provided. For example, the same pitch may be used for receiving at a fundamental transmit frequency. As another example, the pitches may not correspond to the ratio of frequencies of transmit and receive, such as a same pitch for both arrays being used for harmonic imaging or different pitches being used for fundamental imaging.

The differences in spatial distribution of the arrays 12, 16 may allow for interconnection simplification. By having fewer elements due to pitch, element size, array size, circular circumference, or other spatial distribution, the array 16 for transmit operation may connect with a limited number of transmitters in an imaging system, such as 64, 128, 256 or other number of transmit channels. By having a greater number and/or density of elements due to pitch, element size, array size, rectangular distribution, or other spatial distribution, beams with less side lobe or grating lobe contribution may be formed with higher sensitivity. Since electronics may be formed in the semiconductor substrate, the greater number of elements may be used with a fewer number of interconnects to an imaging system.

The upper array has a square, elliptical, or rectangular circumference. The elements 14 at the corners may contribute less, but increase the sensitivity to angled beams. To reduce channel count, the lower array has a circular circumference. The increased grating lobes are reduced due to harmonic reception and/or the spatial sampling of the receiver array. In alternative embodiments, the upper and/or lower arrays have different or the same circumference shapes.

Figure 5:
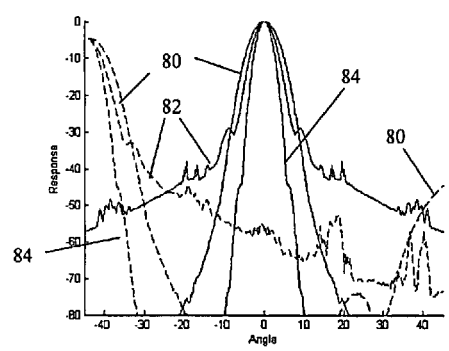
FIG. 5 is an example beam plot of one embodiment of the transducer of FIG. 1.

FIG. 5 shows an example beam plot for the layered array structure of FIG. 1, specifically the harmonic imaging multi-dimensional array example. The transmit beam response 80 includes some side-lobe response. The receive beam response 82 has less side lobe. The two-way response 84 also has less side lobe.

Figure 2:
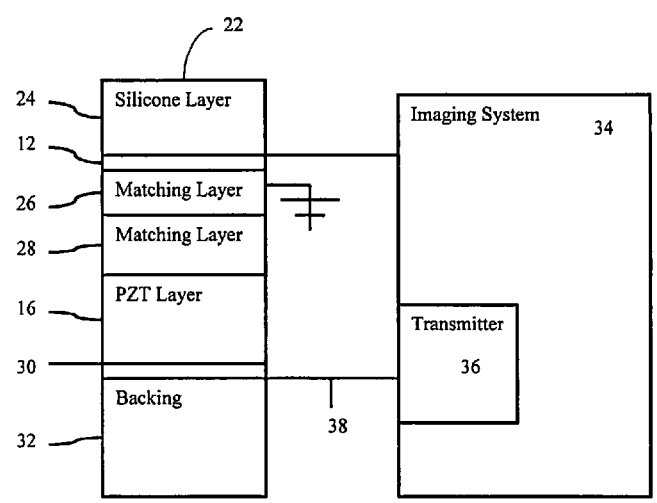
FIG. 2 is a block diagram of one embodiment of a system for transducing between electrical and acoustic energies.

FIG. 2 shows a system for transducing between electrical and ultrasound energies. The system uses the arrays 12, 16 of FIG. 1 or other arrays. FIG. 2 shows a stack of layers associated with the transducer 22, including the PZT and CMUT layers 16, 12 with the arrays of FIG. 1. Additional, different, or fewer layers may be provided in the stack of the transducer 22. The layers are shown for a single element or represent the transducer stack for an entire transducer array.

The transducer 22 is shown connected with an imaging system 34, but may be provided separately from the imaging system 34. The transducer 22 and imaging system 34 are for medical diagnostic ultrasound imaging. This system is for three-dimensional imaging, but may be used for two-dimensional or other ultrasound imaging.

The imaging system 34 is a medical diagnostic imager, an imaging system specifically for this overall system, a computer, or a workstation. In one embodiment, the transducer 22 connects with a releasable transducer connector of the ultrasound imaging system 34 for receiving data or signals output from the transducer 22 or providing transmit signals to the transducer 22. Other connections may be used for receiving data from the transducer 22, such as a wire, flexible circuit, coaxial cables, or wireless transceivers. The back-end imaging system 34 includes a bus, data input, receiver, or other device specifically for operating on data output from the transducer 22.

The system includes a probe housing, the transducer 22, cables 38, and the imaging system 34. Additional, different, or fewer components may be provided. For example, the transmitter 36 may be positioned in the transducer 22 so that the cables 38 are not provided. Other separations between the transducer 22 and the back-end imaging system 34 may be used, such including a receive beamformer or part of a receive beamformer in the imaging system 34.

The probe housing encloses the transducer 22. The probe housing is plastic, fiberglass, epoxy, or other now known or later developed material. The probe housing includes an acoustic window to enhance patient contact and provide electrical isolation. The window is adjacent the face of the transducer 22. The housing is shaped for handheld operation, such as providing a grip region sized and shaped for being held by a user. One or more larger regions may be provided, such as for holding the transducer 22. In other embodiments, the probe housing is shaped for insertion within the body, such as a trans-esophageal, trans-thoracic, intra-operative, endo-cavity, catheter, or other probe shape.

The transducer 22 includes an element, such as the stack shown. The element includes the piezoelectric transducer layer 16 and the capacitive membrane ultrasound transducer layer 12 for transducing. Other layers include a silicone layer 24, a matching layer 26, a second matching layer 28, a flex circuit or electrode layer 30, and a backing layer 32. Additional, different, or fewer layers may be provided. For example, one or more than two matching layers may be provided between the array layers 12, 16.

The silicone layer 24 mechanically and electrically isolates the stack from the patient. In alternative embodiments, other materials than silicone may be used. The silicone layer 24 may be integrated as a window through the probe housing for acoustically scanning a patient with the transducer 22.

The matching layer 26 is Kapton® or other dielectric with an electrode ground plane in the embodiment shown. Other conductive or non-conductive matching layers may be used. For non-conductive matching layers, a separate ground plane or electrode for the PZT layer 16 may be provided on top of, between or below the matching layers 26, 28.

The matching layer 28 is a polymer or other now known or later developed matching layer 28. The matching layers 28, 26 gradually transition between the acoustic impedance of the PZT layer 16 and the patient. The transition may limit acoustic reflection at the boundary with the patient. Quarter wavelength or other thickness matching layers 26, 28 are used to further minimize acoustic reflection.

The electrode layer 30 provides signals to or from the PZT layer 16. In the embodiment shown, the electrode layer 30 provides signals to the PZT layer 16. Since the matching layer 26 grounds the opposite side of the PZT layer 16, the PZT layer 16 expands and contracts in response to changes in electrical potential between the electrode layer 30 and the ground. The electrode layer 30 is a laminated and sintered electrode or may be an electrode in asperity contact with the PZT layer 16. In one embodiment, the electrode layer 30 includes conductive traces routed to different elements on a dielectric, such as Kapton®.

The backing layer 32 is tungsten-loaded epoxy, a silicon-silicone composite, or other now known or later developed acoustic backing. The backing layer 32 absorbs or redirects acoustic energy to limit or avoid reflection back to the PZT layer 16.

The PZT layer 16 corresponds to one or more elements. Each element may be single crystal, ceramic block, multilayer, films, composite, or other now known or later developed transducer element. The elements are separated by kerfs filled with air, epoxy or other material. Each element may be sub-divided.

The backing layer 32, electrode layer 30, PZT layer 16, matching layer 28, and matching layer 26 are a PZT based transducer. Any PZT based transducer design may be used. Similarly, the silicone layer 24 is part of the PZT based transducer, but is separated from the other layers by the CMUT layer 12.

The CMUT layer 12 corresponds to one or more elements. The elements align or are misaligned with elements of the PZT layer in the azimuth, elevation, or both azimuth and elevation dimensions. Other configurations of the layers are possible. For example, the thin silicon layer can be located beneath or between the matching layers.

Figure 3:
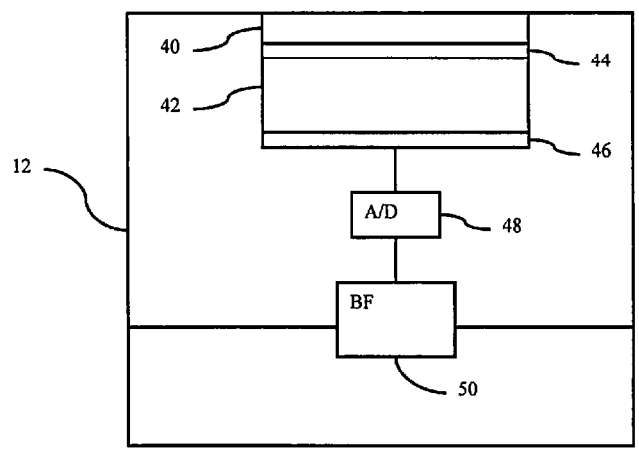
FIG. 3 is a graphical representation of a CMUT with integrated electronics according to one embodiment.

FIG. 3 shows one embodiment of the CMUT layer 12 with a single CMUT. Multiple such as tens, hundreds, or thousands of CMUTs may form or act as an element. The CMUTs are electrically connected together to act as an element.

The CMUT layer 12 includes semiconductor material, such as silicon. Formed in or on the semiconductor material is a membrane 40 over a gap 42. Electrodes 44 and 46 are on each side of the gap 42. Additional structure or different arrangements may be used for the CMUT. For example, the upper electrode 44 may be on either side of the membrane 40 or the membrane 40 may be conductive. The electrode 44 can be buried in the membrane 40. Capacitive membrane ultrasound transducers may be formed from complete membranes, beams, or other moveable structure adjacent the gap 42 for movement. The capacitance changes as the mechanical structure moves, generating electrical signals using the electrodes 44, 46. Changes in potential may cause movement of the mechanical structure (i.e., the membrane 40). Other now known or later developed microelectromechanical device may be used for the capacitive membrane ultrasound transducer. The cMUT is formed using any semiconductor process or another process.

The semiconductor substrate is thin compared with the wavelength of the ultrasound, such as 30 microns or less in thickness (e.g., 30-20 microns) for 1.5 MHz operation. The CMUT structure and any integrated electronics may be provided in thin semiconductor substrate.

In the embodiment shown in FIG. 3, the semiconductor material includes an analog-to-digital converter 48 and at least partial beamforming circuitry 50. At least some of the electronics are formed on a same semiconductor or chip as the array 12. Additional, different, or fewer electronics may be integrated. For example, no electronics are integrated. In one example, a preamplifier, demodulators, down converters, filters, or other devices are provided as analog and/or digital devices. As another example, flip-chip bonding or other connection is provided between the CMUT and the analog-to-digital converters 48 or other circuit. In other embodiments, such as in a catheter, some of the electronics are spaced inches or feet from the array 12, such as the electronics being in a catheter handle. Some or all of the electronics may be provided in other chips, boards or circuits within the transducer 22, in the probe housing, or in the imaging system 34.

Other circuits to reduce the channel count or combine signals in the analog and/or digital domain from multiple elements may be provided, such as multiplexers and/or mixers. Any receive channel circuits may be included in the semiconductor material and connected with the CMUT elements by vias and/or traces.

The beamformer 50 is a delay, interpolator, filter, phase rotator, summer, or combinations thereof. For example, the beamformer 50 relatively delays by temporal delay and/or phase rotation signals received at an element. The beamformer may operate on multi-bit data or single bit data. The signals may also be apodized, such as with an amplifier. The relatively delayed signal from one element is summed with signals from on or more other elements.

For complete beamforming, the signals from all the elements are summed by one adder or a cascade of adders. Partial beamforming may be used, such as summing signals in sub-apertures. For example, the beamformer 50 is operable to at least partially beamform along a first dimension, such as beamforming in azimuth. In the other dimension, such as elevation, the beamformer 50 outputs parallel samplings. Alternatively, partial beamforming (e.g., sub-array beamforming) is provided along multiple dimensions or not performed.

The maximum amount of information out of the multi-dimensional CMUT array 12 may be desired, such as by omitting beam formation. With a two-dimensional array, some beamformation or signal combination may be used to reduce the data rate given the multi-dimensional aperture size and the required Nyquist or near Nyquist spatial sampling. Integrated circuit technology may additionally or alternatively be used to handle the bandwidth and density of wiring involved. Silicon transducers can connect into the chip at integrated circuit density by being manufactured directly on top of the electronics in a monolithic structure. The electronics in the same substrate as the array allows for at least some data compression or beam formation before output to other electronics.

The analog-to-digital converter 48 is a multi-bit or single bit converter. Any now known or later developed converter may be used for sampling the received signals at a Nyquist rate or greater. In one embodiment, the converter 48 is a sigma delta converter. For example, any of the converters disclosed in U.S. Pat. Nos. 7,466,256 or 7,583,214 (Ser. Nos. 11/731,568, filed Apr. 4, 2007, and 11/731,567, filed Apr. 4, 2007), the disclosures of which are incorporated herein by reference, are used.

The electronics in the semiconductor layer 12 or elsewhere may also include a bias source. The bias source is a direct current voltage source, voltage divider, transformer, or other now known or later developed source of fixed or programmable bias. The bias source may include multiplexers. The same or different bias is provided to each element. For example, different biases may be applied to provide focusing or defocusing, such as disclosed in U.S. Pat. No. 7,087,023. The bias may also be used for spatial coding in synthesized transmit apertures.

In one embodiment, the CMUT layer 12 is one of the transducer and electronics embodiments described in U.S. Published Application Nos. 20070236374, 20070242567, or 20070229336 (Ser. Nos. 11/731,568, filed Apr. 4, 2007, 11/788,614, filed Apr. 20, 2007, and 11/731,567, filed Apr. 4, 2007), the disclosures of which are incorporated herein by reference. A sigma-delta converter and associated beamformer are provided in a same semiconductor substrate.

For one example embodiment, filters are applied to single-bit or other oversampled channel data in the receive beamformer 50. The filters are applied to data selected by a dynamic receive delay controller. The filters construct multi-bit samples at a reduced sampling rate. These multi-bit samples are then apodized and summed with other channels. Then, another filter further filters and decimates the beam sum. For example, the first filter is a Kth-order comb filter with an order being one above the order of the sigma-delta converter, and the beam sum filter may be a low-pass filter with a finite or infinite impulse response.

This architecture allows selection or variation between 2 extremes. In one extreme, there is no channel demodulation and the beam sum is computed at the sigma-delta rate. This first extreme often leads to dynamic receive artifacts. In another extreme, complete channel demodulation is provided by long low-pass filters for each channel and the beam sum is computed at the signal Nyquist rate. The second extreme is complicated because of the long demodulation filters required for each channel, making the approach expensive and unsuitable for implementation with parallel beamforming because the long channel filters have to be duplicated or time-multiplexed.

As another example embodiment, the same receive beamformer 50 may be used for different ultrasound modes, including B-mode, Pulsed Doppler, Color flow, Power Doppler, and CW Doppler mode. The same receiver may be used with multiple or different sized elements and corresponding transducers. Sigma-delta paths may be switched between operation as separate receive channels or grouped into receive channels. The grouping may allow operation with desired dynamic range even with lower impedance elements. For grouping, fewer total receive channels may be available. Partial or full beamforming may also be provided. For separate operation, more total receive channels may be available.

A sigma-delta converter ($\Sigma\Delta$) is used. By using $\Sigma\Delta$, a low noise amplifier (LNA) and a mixer may be the only active analog component. Separate variable gain amplifier (VGA) and anti-aliasing filter blocks may be avoided since continuous time $\Sigma\Delta$ does not require any pre-filtering due to the large oversampling ratio and "analog" nature. The TGC function is integrated by using a variable gain $\Sigma\Delta$ and a gain control circuit that varies the reference voltage for the $\Sigma\Delta$ as a function of time to provide TGC.

Base band processing may provide an optimal dynamic range and bandwidth trade-off and minimize power consumption. A multiplying digital-to-analog converter (MDAC) may down convert the signal to base band. The MDAC allows a multi-level local oscillator (LO) waveform to be generated, which allows optimization of the harmonics. Flicker or 1/f transistor noise can be an issue especially with low geometry MOSFET devices. Typically, this noise dominates within one megahertz of a device's output noise spectral density. A chopper clock is used within the $\Sigma\Delta$'s integrators to up-convert this noise outside the band of interest. The noise is then removed by the proceeding filters within the beamformer. The integrators are chopped at a rate, which minimizes signals from aliasing in band after sampling at the quantizer. Nominally, the chopping rate is at half the $\Sigma\Delta$'s sampling rate.

A DC correction loop around the $\Sigma\Delta$ may be used to remove DC offset that occur at the input to the $\Sigma\Delta$, limiting process related variation in performance. The offsets within the $\Sigma\Delta$ are removed by the choppers described previously. The DC correction loop is a mixed signal loop with digital at the input and analog at the output. The loop has a large time constant and could be made to update between receive cycles. In addition, the offset could be removed on a power on cycle and then held constant via memory control of a DAC.

Another advantage of the $\Sigma\Delta$ is single bit processing. Single bit comb FIR filters positioned after the $\Sigma\Delta$ for reconstruction are simple to construct and have a minimal number of gates because no multipliers are needed with single bit processing. After the comb filter, the data becomes multi-bit, but at a decimated rate. The amount of bit processing remains relatively constant where the decimation rate and bit width at the output of the comb filter are usually equal. Non-equal rate and bit width may be used. The data is summed to form a beam, and then sent to a final decimation filter for reconstruction of samples at the Nyquist rate.

For different transducers, different combinations of $\Sigma\Delta$ paths may be used. The outputs of multiple $\Sigma\Delta$ paths may be summed as a single receive beamformer channel, preserving dynamic range for lower impedance elements. The outputs of the same multiple ΣΔ paths may be maintained separate as multiple receive channels for higher impedance elements. Multiple receive beamformer channels are used for beamforming or sub-array beamforming. Given a limited number of ΣΔ paths, different numbers of receive beamformer channels are formed as a function of the impedance and/or connections to elements. For example, sub-array beamforming is provided for a two-dimensional array, but complete beamforming is provided for a one-dimensional array using the same circuit at different times.

Referring to FIG. 2, the CMUT layer 12 is used for receive operation and does not connect with the transmitter 36. The elements connect with the receiver, such as the beamformer 50. Beamformed, partially beamformed, or otherwise combined signals from the elements 14 are output to the imaging system 34. The imaging system 34 may further beamform, detect, or otherwise process the received signals to generate an image. The elements 14 are used only for receiving, but may be used only for transmitting or for both transmitting and receiving.

A plurality of transmitter channel circuits connects with the elements 18 of the PZT layer 16. The elements 18 of the PZT layer 16 are used only for transmit and do not connect with a receiver. Alternatively, the transmit channels connect with the elements 14 of the CMUT layer 12, or the elements 18 of the PZT layer 16 are used for receive operation. The transmitter 36 forms the transmitter channels. Each channel provides a relatively delayed and apodized waveform to a corresponding element 18 of the transmit aperture. Transmit circuits, such as pulsers, waveform generators, switches, delays, phase rotators, amplifiers, memories, digital-to-analog converters, and/or other devices may be used. In one embodiment, linear or arbitrary waveform transmitters are used. For example, pulse compressed waveforms are generated (e.g., frequency chirp waveform with a Gaussian ramp up and Gaussian ramp down envelope). Any compressed waveform may be used. In other embodiments, square waves, such as unipolar or bipolar, or short sinusoidal pulse (e.g., 1-3 cycles) are generated.

The transmitter 36 is within the imaging system 34. Coaxial cables 38 connect the channels of the transmitter 36 to the elements 18. The interconnection is provided by terminating the coaxial cables at the electrodes of the electrode layer 30 or traces on a flex material used for the electrode layer 30. Alternatively, the transmitter 36 is within the probe housing or the transducer 22. Control signals from the imaging system 34 control operation of the transmit circuits.

Figure 4:
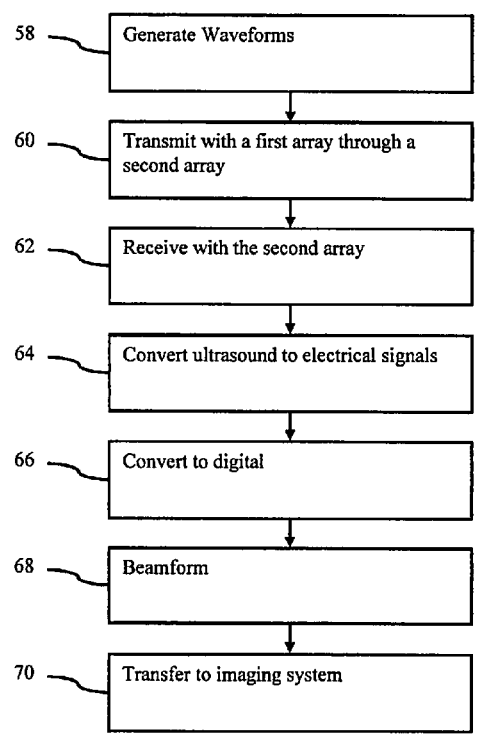
FIG. 4 is a flow chart diagram of one embodiment of a method for generating ultrasound imaging information with a transducer.

FIG. 4 shows a method for generating ultrasound imaging information with a transducer. The method is for two- or three-dimensional imaging. The method is implemented using the transducer of FIG. 1, the system of FIG. 2, and/or a different system or transducer. Different, fewer, or additional acts may be provided. For example, acts 60, 62, and 64 are performed without other acts. The acts are performed in the order shown or a different order.

In act 58, waveforms are generated. The waveforms are square waves, sinusoidal waves, or other waveforms. In one embodiment, the waveforms are pulse-compressed waveforms, such as a chirp. A waveform is generated for each element in a transmit aperture. The waveform for a given element is the same or different than a waveform for another element. For a transmit event, the waveforms are relatively apodized and delayed. The apodization and delay form a focused beam along a scan line. More than one beam may be formed for a given transmit event. Alternatively, the waveforms are for forming a plane wave or divergent wavefront. The waveforms are transmitted or provided to the elements of the transmit aperture.

In response to the waveforms being applied to the elements, the transducer elements generate acoustic energy in act 60. Acoustic energy is transmitted from the elements. The acoustic energy is focused to form one or more beams. The focus is within the region to be imaged. Alternatively, the acoustic energy is unfocussed or a plane wave along at least one dimension for synthetic transmit aperture processing. The transmission is performed one time for an entire volume. In other embodiments, the transmission is performed multiple times to scan the volume with a multi-dimensional array.

The acoustic energy is transmitted through a layer of semiconductor substrate. The wavefront is generated at a top surface of the transducer material of the elements, such as at the top of or within PZT material. The semiconductor substrate connects with the transducer material directly or indirectly and is between the transmit transducer material and the region to be scanned. The semiconductor substrate is thin, such as less than 30 microns thick, allowing transmission through the substrate with minimal reflection. Thicker substrates may be used. One array is used to transmit acoustic energy through another array.

In act 62, acoustic echoes are received in response to the transmitting. The echoes return from the region subjected to the transmit acoustic energy. Reception is performed for each transmission, so may be repeated for a same region or different regions.

The reception is at a transducer array, such as a multi-dimensional transducer array. In one embodiment, the array is of microelectromechanical devices, such as a CMUT array or other small or nano-scale structures with electrical interaction in or one the semiconductor substrate. Other types of arrays may be used for reception, such as a PZT array.

The receiving elements are on a top of the transducer, such as receiving acoustic echoes, which have not passed through another transducer array. The receiving array is adjacent to the region to be imaged. In other embodiments, the receiving elements are at another position, such as spaced from the region to be imaged by one or more arrays. Multiple arrays may be used for receiving, such as receiving with two or more stacked arrays.

In act 64, the received echoes are converted into electrical signals. The elements transduce from the acoustic energy into electrical energy. For a CMUT or semiconductor based transducer, the acoustic energy causes motion, such as flexing of a membrane. The moving component causes variation in a distance between electrodes. This variation in distance causes a change in electrical potential, resulting in the generation of electrical signals. For PZT transducers, the acoustic energy causes contraction and/or expansion of the PZT material. In response, electrical signals are generated across electrodes.

In one embodiment using a multi-dimensional PZT array for transmit and multi-dimensional CMUT transducers for reception, a high signal-to-noise ratio may result due to the focused transmit beam and receive-only CMUTs. Since lithographically defined CMUTs are used on receive, the receiver matrix may be well sampled and provide sub-array or full beamforming with integrated electronics, resulting in good sidelobe level. Providing linear transmitters, such as in the imaging system, allows sophisticated signal processing, such as chirp pulse compression.

In act 66, the electrical signals from the receive elements are converted to digital signals. In one embodiment, sigma-delta conversion is performed, but other conversion may be provided. Sigma-delta conversion outputs single bit samples, but multi-bit samples may be provided. Only one conversion is performed for each element in one embodiment, but multiple or parallel conversions for each receive element may be provided to increase dynamic range.

The conversion occurs before or after amplification. The amplification provides receive signals more likely above a noise level. The amplification and/or the conversion may include a time varying level for depth gain compensation. In one embodiment, the feedback level within a sigma-delta converter varies as a function of time for implementing at least a portion of the depth gain compensation. Digital or analog amplification may be used.

The digital signals output after conversion and any filtering are beamformed and synthesized. The beamforming is partial, or performed for less than the entire aperture. For example, beamforming is provided in act 68 along one dimension, such as in azimuth. For another dimension, synthetic aperture transmit is used. The beamforming provided for this dimension is performed separately from or after beamforming along the first dimension. In another example, the beamforming is performed for multi-dimensional sub-arrays. The sub-arrays are square or other shape, and a sufficient number of sub-arrays are provided to output on a same or fewer number of channels as a receive beamformer in the imaging system. In another embodiment, the beamforming is complete, combining the signals from the elements of the entire receive aperture.

In act 70, the beamformed signals are transferred to an imaging system, computer, or other device from the probe housing or transducer. The transfer is over separate cables, such as one for each sub-array beam sum. In other embodiments, the transfer is over a bus, multiplexed for serial transmission, over the cables used for transmit operation, or wirelessly transmitted. Due to the partial or complete beamforming, the amount of data to be transmitted from the multi-dimensional receive aperture is reduced. Alternatively, further processing, such as completing beamformation, is performed in the probe housing on a board or chip separate from the transducer.

The imaging system receives the beamformed data. Further beamformation may be provided. The data output from sub-arrays is relatively delayed and apodized. The resulting samples are summed. With elevation sub-arrays and previous partial beamforming in azimuth, the beamforming is performed along the elevation dimension. Other sub-array combination may be used.

Beamformed data is detected, filtered, scan converted, and/or otherwise processed for imaging. For three-dimensional imaging, the data is rendered. For example, the data is interpolated or transformed to an evenly spaced grid. The data is rendered by projection or surface rendering. The rendering may be provided in real-time with the scanning or later. Two-dimensional imaging may alternatively be provided.

Any process may be used for manufacturing the transducer 22 of FIG. 2 or the arrays 12, 16 of FIG. 1. In one embodiment, a lower PZT layer 16 and an upper semiconductor layer 12 shown in FIG. 2 is formed. CMOS processing creates under-chip electronics in the semiconductor. Microelectromechanical (MEMS) processing creates cMUTs. The MEMS processing may be a CMOS-compatible process. The wafer of semiconductor material is diced part or all of the way through to define the boundary or circumference of each array. More than one array may be made on a given wafer. The arrays may optionally be covered with an insulation layer, like photoresist, for protection prior to or after dicing. A handle wafer is attached to the CMUT side of the wafer. The CMUT wafer is back ground to the desired thickness, such as 20 um. The grinding also completes the separation of the arrays by thinning the substrate into the dicing cuts. The PZT transducer stack is formed by stacking, bonding, and dicing the layers in any known or later developed process. The semiconductor with the handle wafer still in place is bonded to the top of the PZT transducer stack. The handle wafer is debonded after attachment of the stack, leaving the CMUTs exposed on the top. This ensures that the thin silicon layer is supported at all times. Finally, the silicone is molded or attached.

While the invention has been described above by reference to various embodiments, it should be understood that many changes and modifications can be made without departing from the scope of the invention. As used herein, "connected with" includes direct or indirect connection. It is therefore intended that the foregoing detailed description be regarded as illustrative rather than limiting, and that it be understood that it is the following claims, including all equivalents, that are intended to define the spirit and scope of this invention.

We claim:

1. In an ultrasound transducer array for medical diagnostic ultrasound imaging, an improvement comprising:
   an element having a piezoelectric transducer layer and a capacitive membrane ultrasound transducer layer.
   wherein the ultrasound transducer array comprises a multi-dimensional array of elements including the element, the elements of the multi-dimensional array having the piezoelectric transducer and capacitive membrane ultrasound transducer layers with each of the layers including a plurality of the elements, wherein the piezoelectric transducer layer has a first multi-dimensional array with a greater spatial distribution than a second multi-dimensional array of the capacitive membrane ultrasound transducer layer, and wherein the second multi-dimensional array has a rectangular circumference and the first multi-dimensional array has an elliptical circumference;
   where the element comprises a backing layer, the piezoelectric transducer layer, at least one matching layer, and the capacitive membrane ultrasound transducer layer, the at least one matching layer between the piezoelectric transducer layer and the capacitive membrane ultrasound transducer layer.

2. The improvement of claim 1 wherein the second multi-dimensional array has a greater element density than the first multi-dimensional array.

3. The improvement of claim 1 wherein the piezoelectric transducer layer connects with a transmitter and does not connect with a receiver, and wherein the capacitive membrane ultrasound transducer layer connects with the receiver and does not connect with the transmitter.

4. The improvement of claim 1 wherein the capacitive membrane ultrasound transducer layer comprises semiconductor material, the semiconductor material including an analog-to-digital converter and at least partial beamforming circuitry.

5. The improvement of claim 1 wherein the capacitive membrane ultrasound transducer layer comprises at least one membrane connected with a silicon substrate and suspended over a gap, and electrodes on opposite sides of the gap.

6. The improvement of claim 1 wherein the capacitive membrane ultrasound transducer layer including a membrane, a gap and a supporting substrate is 30 microns or less in thickness.

7. A system for transducing between electrical and ultrasound energies, the system comprising:
- a first multi-dimensional array of first elements formed from piezoelectric material, wherein first multi-dimensional array has an elliptical circumference; and
- a second multi-dimensional array of second elements formed from semiconductor material, and having a rectangular circumference, the second multi-dimensional array positioned at least partially covering a top of the first multi-dimensional array such that acoustic energy generated by the first multi-dimensional array propagates to a patient through the second multi-dimensional array;
- wherein the second multi-dimensional array completely covers the top of the first multi-dimensional array, the second multi-dimensional array having a thickness less than 30 microns, the thickness including a transducing device and supporting substrate.

8. The system of claim 7 wherein the second multi-dimensional array comprises a capacitive membrane ultrasound transducer array on the substrate, the substrate comprising the semiconductor material.

9. The system of claim 7 wherein the first elements have a pitch about two thirds a pitch of the second elements.

10. The system of claim 7 further comprising:
- a plurality of receive channel circuits within the semiconductor material and connected with the second elements, the receive channel circuits operable to at least partially beamform; and
- a plurality of transmitter channel circuits connected with and spaced from the first elements by cables.

11. The system of claim 10 wherein the receive channel circuits comprise sigma-delta analog-to-digital converters.

12. The system of claim 10 wherein the transmitter channel circuits are operable to generate pulse compressed waveforms.

13. A method for generating ultrasound imaging information with a transducer, the method comprising:
- transmitting acoustic energy through a layer of semiconductor substrate;
- receiving acoustic echoes responsive to the transmitting at the layer of semiconductor substrate; and
- converting the acoustic echoes to electrical energy by one or more transducers formed in or on the semiconductor substrate;
- wherein transmitting comprises transmitting with a first multi-dimensional transducer array of piezoelectric material arranged to define an elliptical circumference, and wherein receiving comprises receiving with a second multi-dimensional transducer array of micro-electromechanical devices in or on the semiconductor substrate, the second multi-dimensional array arranged to define rectangular perimeter and positioned between the first multi-dimensional transducer array and a region to be imaged;
- wherein transmitting comprises generating waveforms with transmitters in an imaging system, communicating the waveforms to the first multi-dimensional transducer array connected with and spaced from a patient by the semiconductor substrate, and transducing the waveforms into acoustic energy with the multi-dimensional piezoelectric array, wherein the semiconductor substrate is less than 30 microns thick, and wherein converting comprises converting with capacitive membrane ultrasound transducers in or on the semiconductor substrate.

* * * * *